July 20, 1965 JEAN-MICHEL BALUTEAU 3,195,432
CAMERA FOCUSING DEVICE FOR USE WITH PHOTOGRAPHIC
AND CINEMATOGRAPHIC CAMERAS
Filed Dec. 20, 1960
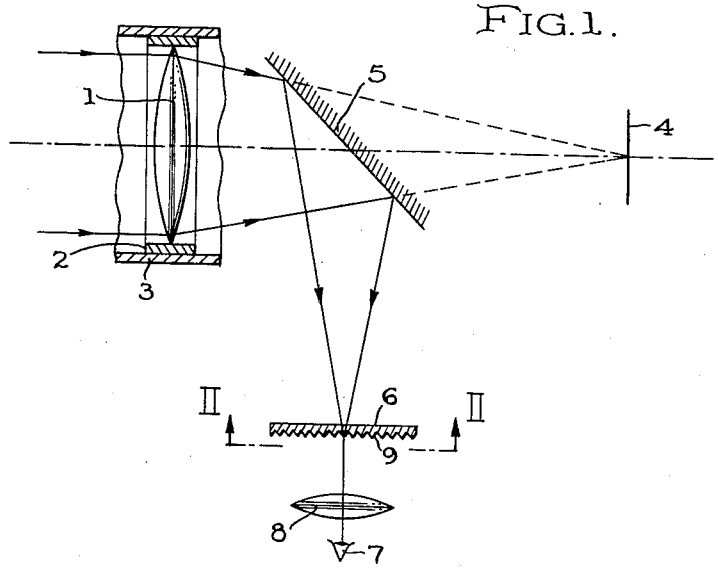
FIG.1.
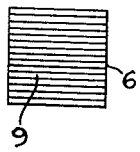  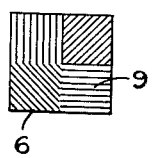  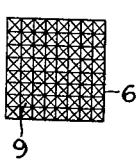  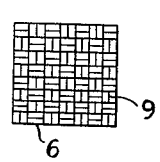
FIG.2.   FIG.3.   FIG.4.   FIG.5.
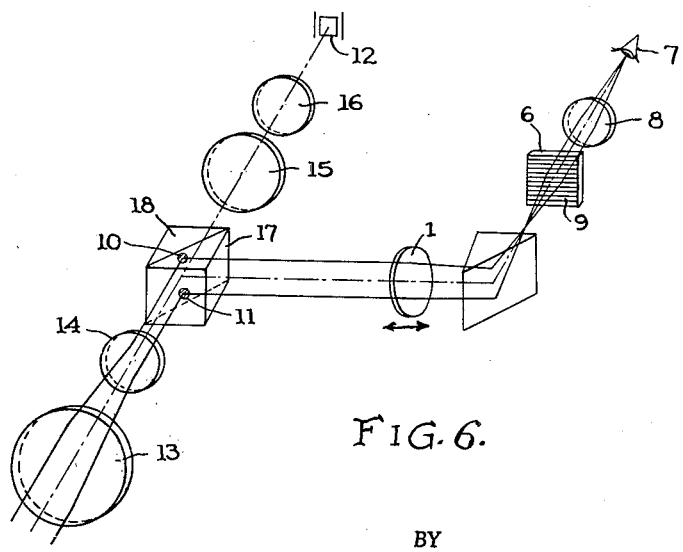
FIG.6.
INVENTOR
BY
ATTORNEY 3,195,432
CAMERA FOCUSING DEVICE FOR USE WITH PHOTOGRAPHIC AND CINEMATOGRAPHIC CAMERAS
Jean-Michel Baluteau, Paris, France, assignor to Societe d'Optique et de Mecanique de Haute Precision, Paris, France, a company of France
Filed Dec. 20, 1960, Ser. No. 77,040
Claims priority, application France, Dec. 21, 1959, 813,680, Patent 1,252,714
1 Claim. (Cl. 95—42)

It is an object of the present invention to provide a focusing range finder device for use with photographic or cinematographic cameras.

Range finder devices have been proposed, in particular in French Patent No. 1,150,544 filed May 11, 1956 (U.S. Patent No. 2,969,706) by the assignee. This patent describes a range finder comprising an objective lens and a prism whose apex is located in a plane perpendicular to the optical axis of the objective and in the zone in which lies the real image formed by the rays from the objective. This range finder comprises furthermore means for effecting coincidence of the plane of the image with the plane perpendicular to the axis and containing the apex of the prism.

With such a range finder, when coincidence is not achieved between the apex of the prism and the real image formed by the objective, certain boundaries or lines of the image will be discontinuous.

In the particular case of a range finder focusing device, the objective of the range finder forming the image can be the camera objective. The prism is then mounted in a view finder of the reflex type, and its apex is located in a so called reference plane with which the plane of the image in the view finder has to be merged.

To adjust the focus, it is sufficient to effect continuity of the lines, i.e. their alignment when these are straight lines for the two half-field images located to either side of the apex, by actuating the focus ring of the objective means which can then carry no indication of distance.

The optical arrangement described in French Patent 1,150,544, (U.S. Patent No. 2,969,706) of the assignee is very accurate; however, it requires delicate operation when the sighted object is moving.

The present invention has for its object to provide an arrangement of a focusing range finder not having the disadvantage just mentioned and allowing easy focus in the case of sighting on moving objects.

According to the invention the arrangement of a focusing range finder comprises an objective, an optical element having a plane face carrying rectilinear ridges with planar walls, this face being located in a plane perpendicular to the mean axis of the objective and in the region where is located the real image formed by the rays of the objective, means for locating the plane of said image in the space defined by the apices of the ridges and a system for viewing the image of a sighted object formed by the objective through the plane face.

The invention will now be described in more detail referring to embodiments given by way of example and shown in the drawings.

FIGURE 1 is a schematic longitudinal section of an arrangement for a focusing range finder according to the invention.

FIGURE 2 is a view along the line II—II of FIGURE 1.

FIGURES 3, 4 and 5 are views along II—II of FIGURE 1 of various embodiments.

FIGURE 6 is a schematic perspective view of a sighting apparatus comprising an arrangement for a focusing range finder according to the invention.

This view finder of FIG. 1 comprises an objective 1 mounted in a ring 2 sliding in a mounting 3. The photographic image forms on a sensitive surface 4.

On the path of the light rays is located a partly or wholly reflecting plate 5 which reflects the rays toward an optical element 6 having a plane face carrying ridges. The eye 7 of the observer sees an image through eyepiece 8.

The section of the ridges 9 of the optical element 6 in a plane perpendicular to the plane face and perpendicular to the direction of the ridges forms a broken line of straight segments.

The ridges present two sets of straight apices located in two parallel planes perpendicular to the mean ray passed through the objective.

The focusing arrangement which has just been described functions as follows:

If the plane face is located so that the image formed by the objective 1 falls between the two planes containing the rectilinear peaks of the ridges the eye 7 which sees this image through eyepiece 8 sees the image at its maximum definition.

If the plane face of the optical element 6 is progressively moved away from the previous position the image duplicates, at first slightly under the effect of the ridges, then the misalignment increasing by reason of the growing degree of duplication of the image.

The two planes in which lie apices of the dihedrals which are formed by ridges should preferably be as close as possible to ensure high precision of the focusing arrangement, that is to say the ridges should be as shallow as possible.

FIGURE 2 shows a single series of ridges 9 rectilinear and parallel. FIGURE 3 shows a variant for which the optical element 6 comprises several series of ridges 9 having different directions. In this last case the ridged face is divided into square zones, the direction of the ridges of one zone being different from the direction of the ridges of a neighbouring zone.

FIGURE 4 shows another arrangement for which a ridged face comprises two series of ridges intersecting at right angles and defining pyramids of square base, with plane faces.

FIGURE 5 shows yet another arrangement for which the ridged face carries portions of ridges of alternate directions perpendicular to one another.

Whatever the arrangement of the ridges, the displacement of the objective 1 allows, as has been indicated, provision at the same time of a range finder arrangement comprising the ridged face 6 and the viewing apparatus.

The distance between the two planes containing the apices of the ridges 9 of the element 6 ought to be as small as possible, and in all cases lower than the latitude of focusing permissible for cameras, having regard to the precision thereof.

The view finder equipped with the range finder device which has just been described has a particularly simple operation when the objects viewed are moving. It is possible in fact to bring the image of the sighted object exactly between the two planes containing the apices of the dihedrals formed by the ridges without any difficulty, since in moving from this position the image observed by the eye 7 duplicates and becomes blurred. In process of adjustment and by movement in one sense and in the other of the adjustment means of the objective 1, one sees two successive blurred images and it is for one position corresponding to a zone located between these two blurred images that one obtains the definition of the image, that is to say, the focusing.

FIGURE 6 shows very schematically and in perspective a view finder comprising the range finder focusing device according to the invention for a particular use and on a ridged arrangement.

The ridges 9 on the face of the optical element 6 here are formed by a series of identical dihedrals and the eye 7 of the observer is located at the image-focus of the eye piece 8. This results in the rays incident on the eyepiece being parallel to one another.

The ridges 9 being further parallel to one another and being formed by two series of faces parallel to each other, and intersecting to form the apices of the dihedral, the rays passing through the objective 1 of the telemetric view finder to the element 6 are divided into two series of beams, each of the beams being formed by parallel rays.

The result of this is that the optical arrangement comprises two entry pupils 10 and 11 located on the partially reflecting surface, the images of these pupils produced by the objective being at infinity.

The spacing between the two pupils is a function of the focal distance of the objective 1, made movable for telemetric focusing and of the angle of the dihedral of the ridges. It is then possible to form these two entry pupils 10 and 11 by two openings of suitable dimensions and positions.

The characteristic which has just been mentioned shows that one can limit oneself to the withdrawal of two small parts only of the light beam entering the camera, the rest of the beam being used wholly for forming an image on a sensitive surface 12.

In the particular case shown in FIGURE 6 the movable lenses 13 and 14 form an afocal system, the lenses 15 and 16 completing the assembly of the camera objective.

The reflection of the two light rays necessary for the telemetering focusing device is obtained through a beam divider comprising two small silvered plates formed in the plane common to two side-to-side prisms 17 and 18, these two prisms constituting a lamina with parallel faces.

The two small silvered plates can be located exactly at the position of the pupils of entry 10 and 11 and have only the dimensions of those pupils of entry.

The rest of the light beam, that is to say, practically the whole of the beam is then used to form the image on the sensitive surface 12.

If, instead of using an optical element 6 provided with a single series of ridges, a lamina having two series of perpendicular ridges is used, forming square base pyramids (FIGURE 4), one would have not two pupils but four. There is nothing to be changed in this case in the principle of functioning of the apparatus but the aspect of the image is altered. One sees then two duplicates in perpendicular directions.

One can provide the same general arrangment by using pyramids having polygonal bases having $p$ sides. In each case there must be located the appropriate number of apertures in the focal plane of the objective 1.

It is to be understood that the invention is not limited to the details of the embodiment of execution which has just been described, they can be modified without departing from the scope of the invention.

What I claim is:

A camera focusing apparatus comprising a view finder objective, a flat transparent optical element having a first face, a plurality of shallow rectilinear ridges on said first face having a depth not greater than the allowable focusing error of the camera and having two series of parallel plane faces intersecting in two series of spaced apices, said first face being located in a plane perpendicular to the axis of said view finder objective and in the region of the real image of a sighted object formed by the light rays passing through said view finder objective, means for moving said view finder objective along its axis for locating the plane of said image in the plane of maximum definition lying between said two series of spaced apices, an eye piece lens for viewing the image formed by said view finder objective through said optical element, a front afocal lens system, a beam divider including two small angled reflecting elements located at the positions of the pupils of entry defined by the view finder objective, the optical element and the eye piece lens, said reflecting elements corresponding in size to the dimensions of said pupils of entry, additional objective lenses lying on the axis of said afocal lens system between an image receiving sensitive surface and said reflecting elements, said afocal lens systems and said additional objective lenses constituting the camera objective, said reflecting elements reflecting to said view finder objective a part only of the light rays traversing said afocal lens system.

References Cited by the Examiner

UNITED STATES PATENTS

| 2,341,410 | 2/44 | Mihalyi | 88—1.5 X |
| 2,589,014 | 3/52 | McLeod | 88—1.5 |
| 2,969,706 | 1/61 | Rosier et al. | 88—2.4 |
| 2,986,599 | 5/61 | Lindner et la. | |
| 3,003,387 | 10/61 | Schiele | 88—1.5 X |

FOREIGN PATENTS 753,376   2/53   Germany.

OTHER REFERENCES

Schiele: German application No. 1,040,364, printed Oct. 2, 1958 (KL 57a 10/01).

DAVID H. RUBIN, *Primary Examiner.*

EMIL G. ANDERSON, *Examiner.*